United States Patent [19]

Moorehead

[11] Patent Number: 4,991,949
[45] Date of Patent: Feb. 12, 1991

[54] DUST PROTECTION DEVICE FOR AN IMAGE SENSOR

[75] Inventor: Robert M. Moorehead, Richardson, Tex.

[73] Assignee: Comar, Inc., Richardson, Tex.

[21] Appl. No.: 469,030

[22] Filed: Jan. 23, 1990

[51] Int. Cl.⁵ ............................................. G02B 27/00
[52] U.S. Cl. ..................................... 350/582; 350/589
[58] Field of Search ......................... 350/582; 390/589

[56] References Cited

U.S. PATENT DOCUMENTS 3,917,382  11/1975  Amann ................................. 350/582
4,056,309  11/1977  Harbison et al. ................... 350/582

FOREIGN PATENT DOCUMENTS 155889      3/1954   Australia ............................. 350/582
WO89/01643  2/1989   European Pat. Off. ............ 350/582
1243005     6/1967   Fed. Rep. of Germany ...... 350/582
1442738     1/1970   Fed. Rep. of Germany ...... 350/582
69019       4/1986   Japan .................................. 350/582

OTHER PUBLICATIONS

R. J. Kawecki, "Protective Shield for Laser Lens", IMB Tech. Disc. Bull., vol. 13, No. 10, Mar. 1971, p. 3165.

Primary Examiner—Jon W. Henry
Attorney, Agent, or Firm—Ross, Howison, Clapp & Korn

[57] ABSTRACT

A dust protection device for an image sensor includes a housing in which the image sensor is mounted. The housing includes an aperture for allowing reflected light from the object being viewed to enter the housing and impinge upon the image sensor. A trasparent film is mounted across the aperture for preventing dust from entering the housing. The transparent film is selectively movable for providing a continuous clean surface across the aperture.

1 Claim, 1 Drawing Sheet

DUST PROTECTION DEVICE FOR AN IMAGE SENSOR

TECHNICAL FIELD OF THE INVENTION

The present invention relates to image sensing devices, and more particularly a dust protection device for an image sensor.

BACKGROUND OF THE INVENTION

Image sensing devices are utilized for a wide variety of purposes including, for example, data capture and inspection of manufactured articles. The inspection of printed images and the quality of image reproduction where repeated inspection of a printed image is required is well suited to an automated process in which an image sensor or camera is utilized. In the printing industry, prints are run at high speed, and due to the quality of paper, the environment in which an image sensor operates, may become very dusty with foreign particles interfering with the operation of the image sensor. Frequent cleaning of the image sensor is therefore required in order to ensure proper operation of the sensor.

Due to the location of an image sensor within an image inspection system, particularly in a printing press environment, it may be difficult to manually clean the lens or housing containing an image sensor. Systems have been proposed which utilize air pressure for cleaning a lens of an image sensor or the surrounding air within a plenum chamber housing the image sensor; however, such devices require additional equipment with associated maintenance problems. Additionally, large air flows surrounding an image sensor may also interfere with the operation of the image sensor.

A need has thus arisen for a protection device for an image sensor which is automatic in operation, and which does not interfere with the operation of the image sensor.

SUMMARY OF THE INVENTION

In accordance with the present invention, a dust protection device for an image sensor is provided. The device includes a housing in which the image sensor is mounted. The housing includes an aperture for allowing reflected light from the object being viewed to enter the housing and impinge upon the image sensor. A transparent film is mounted across the aperture for preventing dust from entering the housing. The transparent film is selectively movable for providing a continuous clean surface across the aperture.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 2:
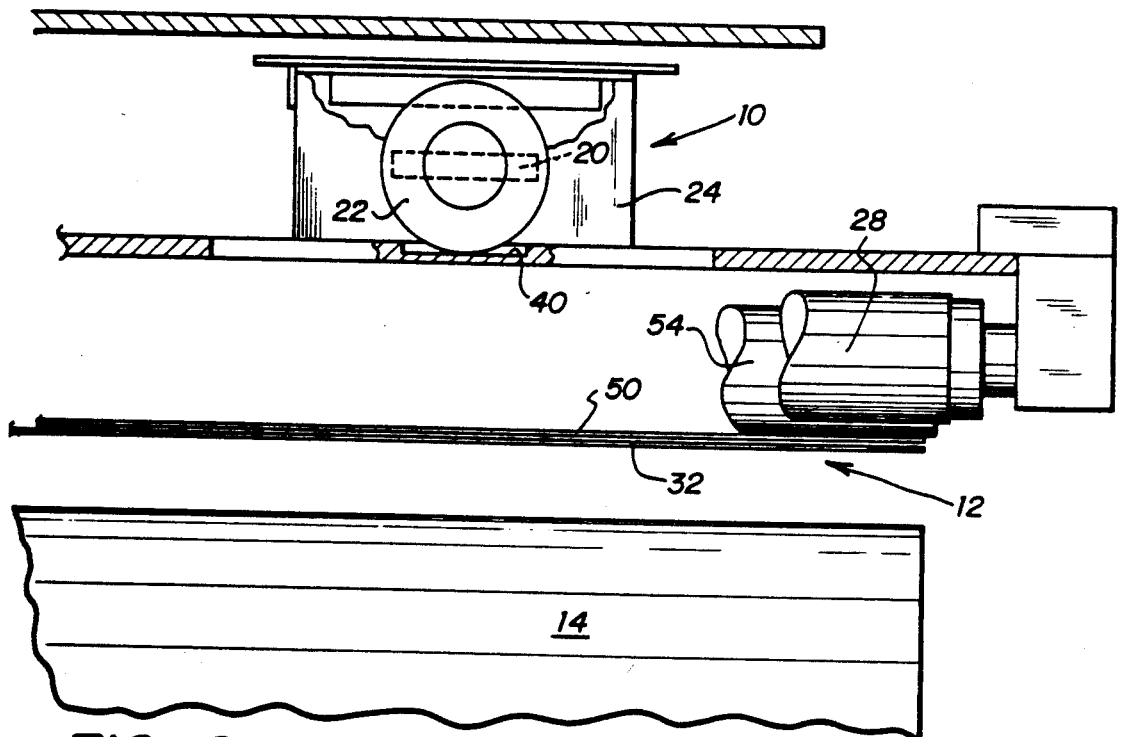
FIG. 2 is a sectional view taken generally along sectional lines 2—2 of FIG. 1 of an image sensor utilizing the present dust protection device.
Figure 1:
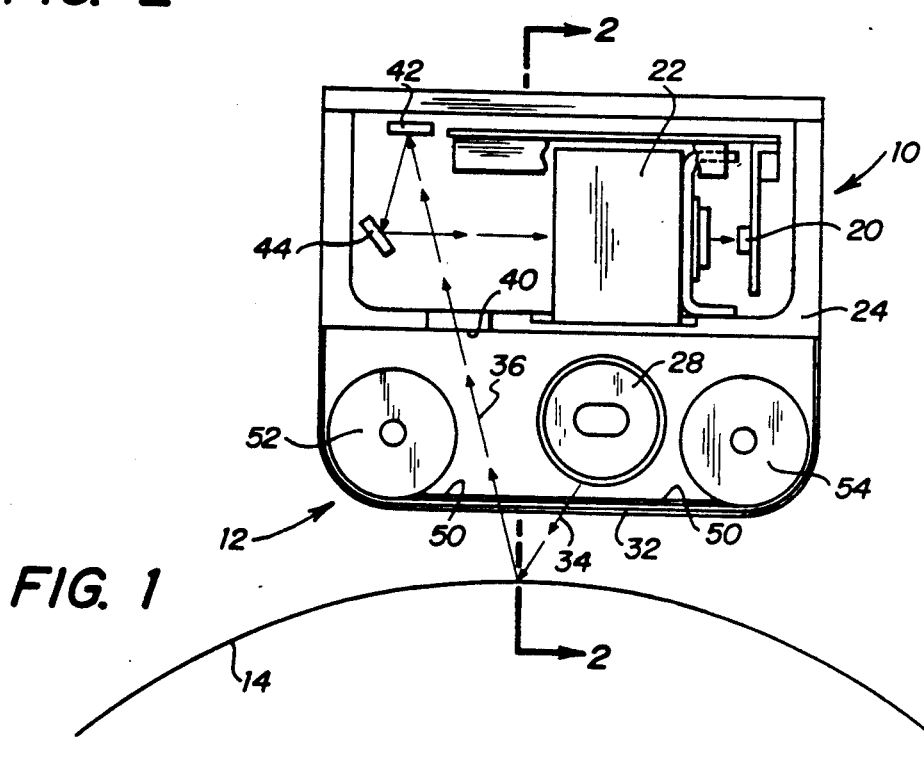
FIG. 1 is an end view of an image sensor utilizing the present dust protection device.

Referring simultaneously to FIGS. 1 and 2, an image sensor for use with the present dust protection device is illustrated, and is generally identified by the numeral 10. Image sensor 10 may be utilized for capturing any type of image, and the present dust protection device, generally identified by the numeral 12 may be utilized with any type of image sensor 10. As illustrated herein, image sensor 10 is utilized for inspecting the printed image of a newspaper or photographic print carried by a transfer cylinder or drum 14, it being understood that the present invention is not limited to the use of an image sensor in a particular environment.

Image sensor 10 includes a sensing array, such as for example, a CCD array 20 and a lens assembly 22 mounted within a housing 24. The printed image to be inspected utilizing image sensor 10 is illuminated by a light source, such as for example, a fluorescent bulb 28 disposed within housing 24. Housing 24 includes an aperture 32 for allowing light to impinge upon the surface of drum 14 along path 34. Reflected light from the surface of the printed image is reflected along path 36 through a second aperture 40 within housing 24. The reflected image is then reflected from the surfaces of mirrors 42 and 44 to lens assembly 22 for impingement upon CCD array 20.

The existence of aperture 32 within housing 24 allows dust and other foreign particles to enter housing 24 and interfere with the operation of CCD array 20. The present dust protection device 12 provides a closure for aperture 32 and thereby prevents foreign particles from entering housing 24 to ensure proper operation of CCD array 20. Dust protection device 12 is disposed within housing 24 and includes use of a clear transparent film 50 which extends across aperture 32. Film 50 is supplied by a supply reel 52 at one end of aperture 32 and is collected at the opposite end of aperture 32 on a takeup reel 54. Takeup reel 54 is actuated through the use of a motor (not shown) for automatically moving film 50 across aperture 32. Dust particles and other foreign matter are collected on the surface of film 50, and are thereby prevented from entering housing 24. Reel 54 is periodically actuated to present a clean surface of film 50 to cover aperture 32, thereby automatically cleaning aperture 32. Any dust and foreign particles are therefore trapped between layers of film 50 on takeup reel 54.

Film 50 may comprise, for example, Mylar plastic and have a thickness of, for example, approximately 2-3 mils.

It therefore can be seen that the present invention provides for an automatic and maintenance free dust protection device for an image sensor. The protection device utilizes a thin film of plastic which is continuously moved across an aperture of a housing containing the image sensor.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A dust protection device for an image sensor for capturing an image of an object comprising:
   a housing;
   an image sensor mounted within said housing;
   an illumination source mounted within said housing;
   said housing including an aperture disposed adjacent said illumination source for allowing light from said illumination source to impinge on the object and for allowing reflected light from the object to reenter said housing to impinge upon said image sensor;

a continuous sheet of plastic material mounted within said housing between a supply and a takeup reel, said reels being mounted adjacent said illumination source and adjacent said aperture and within said housing for preventing dust from entering said housing through said aperture; and said continuous sheet of plastic forming a wall for said housing and being selectively movable from said supply reel across said aperture and adjacent said illumination source to said takeup reel thereby providing a clean surface across said aperture.

* * * * *